United States Patent [19]

Legras et al.

[11] Patent Number: 4,956,219
[45] Date of Patent: Sep. 11, 1990

[54] METHOD OF PRODUCING PERFORATIONS IN A SOLID MATERIAL IN SHEET FORM, AN IRRADIATION DEVICE FOR WORKING THE METHOD, AND THE RESULTING PERFORATED MATERIAL

[75] Inventors: Roger Legras, Hannut; Yves Jongen, Ohain, both of Belgium

[73] Assignee: Universite Catholique de Louvain, France

[21] Appl. No.: 130,223

[22] PCT Filed: Mar. 24, 1987

[86] PCT No.: PCT/FR87/00089
§ 371 Date: Jan. 25, 1988
§ 102(e) Date: Jan. 25, 1988

[87] PCT Pub. No.: WO87/05850
PCT Pub. Date: Oct. 8, 1987

[30] Foreign Application Priority Data

Mar. 25, 1986 [FR] France ................ 86 04263

[51] Int. Cl.⁵ .................................. B32B 3/00
[52] U.S. Cl. ........................ 428/137; 428/220; 428/412; 428/480; 428/515; 428/520; 204/157.15; 321/234; 250/492.3; 156/625
[58] Field of Search ............. 204/157.15; 328/234; 250/492.3; 156/625; 428/137, 220, 412, 480, 515, 520

[56] References Cited

U.S. PATENT DOCUMENTS

| 3,303,085 | 2/1967 | Price et al. | 428/137 |
| 3,493,751 | 2/1970 | Davies et al. | 250/83 |
| 3,612,871 | 10/1971 | Humphrey, Jr. et al. | 250/83 |
| 3,677,844 | 7/1972 | Fleischer et al. | 156/2 |
| 3,713,921 | 1/1973 | Fleischer et al. | 156/2 |
| 3,852,134 | 12/1974 | Bean | 156/8 |
| 4,115,303 | 9/1978 | Marchand et al. | 521/53 |

FOREIGN PATENT DOCUMENTS 0109147 5/1984 European Pat. Off. .
1375204 11/1974 United Kingdom .

OTHER PUBLICATIONS

Flerov et al., "Practical Applications of Heavy Ion Beams", *Sov. Phys.-Usp.*, Mar.-Apr. 1975, pp. 783-793, Copyright 1975 American Institute of Physics.
Fischer et al., "Production and Use of Nuclear Tracks: Imprinting Structure on Solids", *Reviews of Modern Physics*, vol. 55, No. 4, Oct. 1983; Copyright 1983, The American Physical Society.
Physical Review, vol. 133, No. 5A, 3-2-64, pp. A 1443–1449.
Science, Jul. 23, 1965, vol. 149, No. 3682, pp. 383-392.

*Primary Examiner*—Patrick Ryan
*Attorney, Agent, or Firm*—Mason, Fenwick & Lawrence

[57] ABSTRACT

The invention relates to a method of producing perforations in a solid material in sheet form, an irradiation device for working the method and the resulting perforated material.

30 Claims, 5 Drawing Sheets

METHOD OF PRODUCING PERFORATIONS IN A SOLID MATERIAL IN SHEET FORM, AN IRRADIATION DEVICE FOR WORKING THE METHOD, AND THE RESULTING PERFORATED MATERIAL

The invention relates to a method of producing perforations in a solid material in sheet form, an irradiation device for working the method and the resulting perforated material.

It is already known to obtain perforations in a solid material in sheet form, in a first phase by producing traces of damage to the material, using particles which adversely affect the material along their trajectories, and in a second phase by chemical treatment for selectively attacking or corroding the material along the damaged traces (Physical Review, volume 133a, No. 5a, 1964, pages 1443 ff, Science, volume 149, No. 3682, 1965, pages 383 ff).

A number of variants of this method have been proposed. U.S. Pat. No. 3,303,085 describes the production of perforations having a transverse dimension (diameter) between 5 and 20,000 Å in a mica sheet 100 microns thick. The mica sheet is placed in a reactor and bombarded by $\alpha$ particles or oxygen ions and then chemically treated with a solution of hydrofluoric acid. U.S. Pat. No. 3,493,751 describes the production of perforations in a sheet of cellulose nitrate about 0.02 mm thick. The cellulose nitrate sheet is bombarded with $\alpha$ particles having an energy of about 4.5 Mev, then chemically treated with a 6 N aqueous solution of sodium hydroxide at between 60° and 70° C. for 30 seconds. U.S. Pat. No. 3,612,871 describes the production of perforations in a sheet of synthetic resin, inter alia polycarbonate. The polycarbonate sheet is irradiated in a nuclear reactor then subjected to electromagnetic radiation at a wavelength below 4,000 Å and having an energy of at least 1.5 Mev and finally chemically treated with an aqueous solution of sodium hydroxide at about 60° C. for 20 seconds. GB PS No. 1 375 204 describes the production of perforations in a film of non-conductive material by irradiation with sufficiently heavy, energetic ions followed by chemical treatment for widening the traces left by the ions. The materials under consideration are polyethylene terephthalate, polytetrafluoroethylene, polycarbonate, glass and vinyl polychloride. The ion bombardment energy is between 5 Mev and 20 Mev. The ions under consideration are ions of argon, chlorine and iron. The bombardment density is between $5.10^{12}$ and $9.10^{13}$ traces per square inch. After being bombarded, the membrane can be stretched or heated.

Other variant processes are considered in the prior art (U.S. Pat. Nos. 3713921, 3,852,134 and 3,677,844 and French PS No. 2181215).

As is clear from the known state of the art, the main aim hitherto has been to define the physical and chemical conditions for the process under consideration, rather than the conditions for industrial operation so as to obtain, under acceptable economic conditions and in a sufficiently simple process, inter alia continuous, a strip material formed with perforations and of good quality, inter alia with regard to the uniformity and dimensional regularity of the perforations. Hitherto the process has mainly been worked by using nuclear reactors rather than particle accelerators. The use of a particle accelerator and the associated irradiation device poses a number of problems which, if not solved, may limit the use of accelerators or result in perforations of inadequate quality.

More particularly, continuous treatment of a strip material is difficult because of the intense vacuum in the associated irradiation device downstream of the accelerator, and the inadequate speed of chemical treatment. Also, the beam of particles produced by the accelerator is such that the resulting distribution of perforations in the material is usually insufficiently homogeneous and therefore unacceptable for certain applications. Finally the beam, if intense, can produce directly adjacent impacts in the material, and after chemical treatment the impacts result in multiple perforations made up of a number of elementary perforations (two or even three perforations). The result is a decrease in the dimensional regularity of the perforations, with a consequent loss of selectivity of the material with regard to the filtering power resulting from the perforations.

The invention therefore aims to solve the problem of industrial use of the previously-described method (bombardment followed by chemical treatment) in order to manufacture a perforated strip material under acceptable economic conditions and with very high quality, inter alia with regard to the uniformity and dimensional regularity of the perforations, using an irradiation device associated with a particle accelerator.

Accordingly the invention proposes firstly, a method of forming perforations in a solid material in sheet form by the previously-described technique, in which the material is bombarded with heavy strongly-ionised, accelerated ions having an energy of the order of 2 Mev per nucleon, the beam of accelerated particles having an intensity between e.g. $10^6$ and $10^{13}$ ions per second, using an irradiation device combined with an isochronous cyclotron placed upstream. Also, operation is continuous as explained hereinafter, the sheet of material forming a strip which moves firstly in the irradiation device and then in at least one chemical treatment bath. According to another feature of the invention, the material is chemically treated, after receiving traces of damage as previously described, by a solution of corrosive product in an organic solvent. The selected organic solvent is an alcohol, inter alia ethanol, isopropanol or preferably methanol. According to other features of the invention, the beam of accelerated particles is deflected so as to tranversely to scan the strip of material, thus regularising the density of perforations in the material and varying the angle of attack on the material by the particles, thus tending to avoid multiple particles and obtaining a perforated material having good selectivity.

The invention also relates to an irradiation device combined with an isochronous cyclotron disposed upstream for working the method. The high-vacuum chamber of the irradiation device is associated with a sealing-tight tank containing a handler for the strip of material to be treated, the high-vacuum chamber being separated from the sealing-tight tank, where the vacuum is less intense, by a diaphragm adapted not to substantially slow down the particles. According to other features of the invention, the irradiation device comprises means for deflecting the particle beam and means for varying the angle of attack by the particles on the strip of material to be treated.

Finally the invention relates to a material obtained by working the method. The synthetic material, inter alia a polymer, can have a thickness of the order of a few microns to more than 100 microns and a density of perforations per cm$^2$ of up to 10$^{-11}$, the perforations having a diameter between 100 and 100,000 Å.

The invention is noteworthy in that the thus-perforated material can be manufactured continuously, not only under very satisfactory economic conditions but also with excellent quality, thus considerably widening the range of uses of this kind of perforated material, which can be used e.g. as an ultra filtration membrane.

The other features of the invention will be clear from the following description with reference to the accompanying drawings in which.

BRIEF DESCRIPTION OF DRAWINGS

The invention relates to a method of producing perforations 1 in a solid sheet material 2, in which the material 2 is first bombarded with particles 3 to obtain traces of damage to material 2 in its thickness, after which the bombarded material 2 is selectively attacked along the damaged traces in order to obtain the perforations 1, which normally extend right through the material 2.

According to the invention, material 2 is bombarded with strongly ionised, accelerated heavy ions 3 having an energy of the order of 2 Mev per nucleon, the beam of accelerated particles 3 having an intensity between 10$^6$ and 10$^{13}$ ions per second, using an irradiation device 4, more particularly combined with an isochronous cyclotron disposed upstream of the irradiation device 4.

The particles 3 in the beam have at least substantially parallel paths. The area of material 2 bombarded by particles 3 is disposed at least substantially perpendicular to the beam of particles 3. In right cross-section the beam has a suitable shape, inter alia rectangular, the major side being e.g. equal to or about 50 mm and the minor side being e.g. equal to or about 10 mm.

Material 2 forms a strip moving inter alia at constant linear speed in the irradiation device 4 and, if required, subsequently moving in one or more chemical treatment baths, so that considerable lengths of material 2 can be processed continuously and the method can thus be conveniently automated. More specifically, a certain length of material 2—e.g. up to a number of meters or tens of meters—is continously processed in the irradiation device 4 by moving it at a suitable linear speed, usually constant. Subsequently the same length of material 2 is chemically treated, either dynamically by moving in one or more chemical treatment baths at a suitable linear speed, which may or may or be identical with the speed in the irradiation device 4, or statically by being immersed in its entirety in the bath or baths and remaining there for a suitable time. The chemical treatment is carried out continuously immediately after bombardment or after a certain time of rest or storage.

For example, the strip of material 2 is driven in the irradiation device 4 at a linear speed between 0.01 meters per second and 5 meters per second, inter alia at or near (or even above) 1 meter per second approximately.

The particles 3 used for bombarding the material 2 are preferably ions of rare gases, inter alia argon, krypton, neon or xenon. Many favourable results have been obtained with argon.

According to the invention, the beam of accelerated particles 3 is progressively deflected (i.e. by varying the relative angle of attack on material 2 by the beam of particles 3 taken in its entirety) thus regularising the density of perforations 1 in the strip of material 2. To this end, beam 3 is used for transverse sinusoidal scanning, inter alia permanent scanning, of the strip of material 2. Preferably the amplitude of scanning is greater than the width of the strip 2 (e.g. is equal to or more than twice this width), to prevent the non-linearity which would result from bombarding the material 2 at the end of the scanning travel. The frequency of scanning the strip 2 with beam 3 is such that the advance of the strip 2 during one period of scanning by beam 3 is not more than, and generally less or much less than, the dimension of beam 3 in the direction of advance of strip 2, so that particles 3 bombard a single elementary surface of material 2 in a number of successive passes, thus regularising the density of perforations 1 in strip 2.

Figure 3:
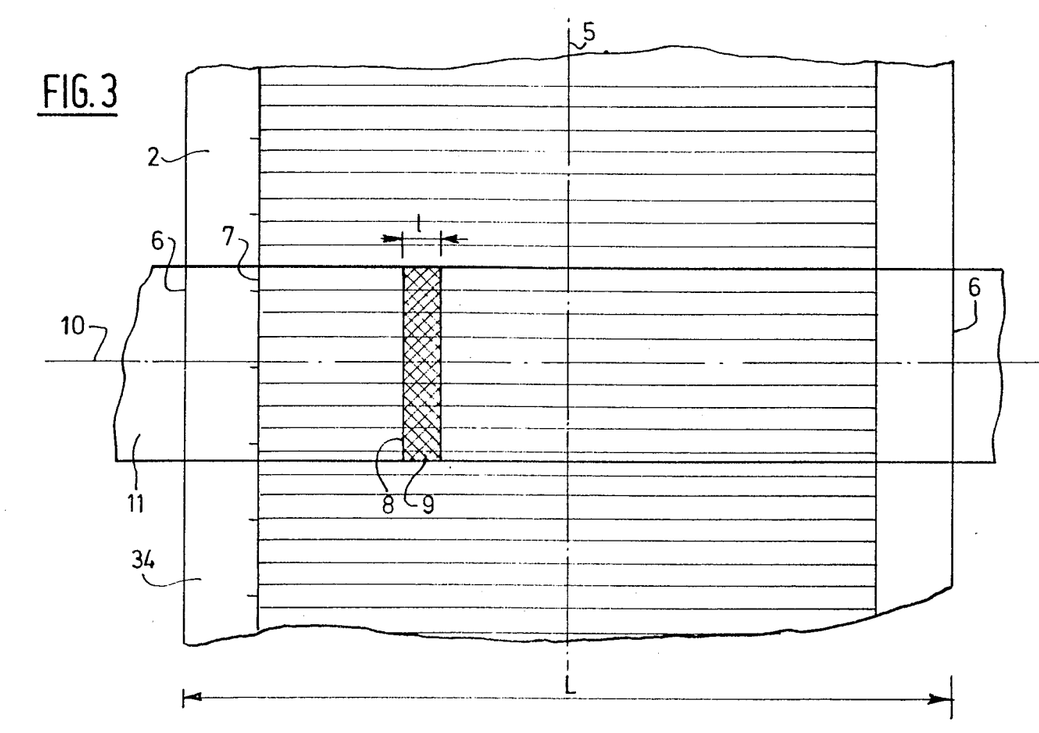
FIG. 3 is a diagrammatic view in elevation of a strip of material showing the area of bombardment and scanning by the beam of particles.

Accordingly, FIG. 3 shows a portion of strip 2 having a central longitudinal axis 5 (in the direction of advance of the strip) and bounded by two longitudinal edges 6. The trace of the beam of particles 3 on the strip defines a bombarded surface 7 (represented by double shading) which, as previously stated, can be rectangular, its major sides 8 being parallel to axis 5 and its minor sides 9 being transversely disposed on strip 2. As is clear from the values previously given for the dimensions, the width l of the bombarded surface 7 is less, inter alia much less, than the width L of the strip of material 2. For example l is about L/20. As result of the transverse scanning by beam 3, the bombarded surface 7 is transversely displaced on the strip 2 along a transverse central axis 10, thus defining a transverse bombardment area 11 bounded by sides 9. Area 11 extends far beyond the longitudinal edges 6, owing to the amplitude of scanning compared with the width of the strip 2, so that strip 2 is disposed only in the central part of the bombardment area 11, where the movement of beam 3 is at least substantially linear. For example, the bombardment area 11 extends over a transverse amplitude of about 40 cm in the case of a strip 2 having a width L about 20 cm. In view of the preceding, and the fact that the scanning by beam 3 is considerably faster than the speed of advance of strip 2, the transverse central axis 10 is substantially straight and perpendicular to the longitudinal axis 5. If the scanning frequency is 50 Hz (=the electric mains frequency), the speed of advance of the strip 2 during bombardment is about 60 cm/sec, and the dimensions of the bombarded surface 7 are as previously stated, the bombardment is carried out in a number of passes in order to regularise the distribution of impacts by particles 3 on strip 2, i.e. the uniformity of the perforations 1 subsequently obtained. For example, a single elementary surface of material 2 is bombarded about nine times. The number of bombardment passes can be varied in dependence on the various numerical values used. Scanning is brought about by reciprocating sinusoidal pivoting of beam 3 in its entirety, and results in a variation in the angle of impact from one longitudinal edge to the other edge of strip 2. However, this variation is usually very small, of the order of a few degrees only.

Figure 7:
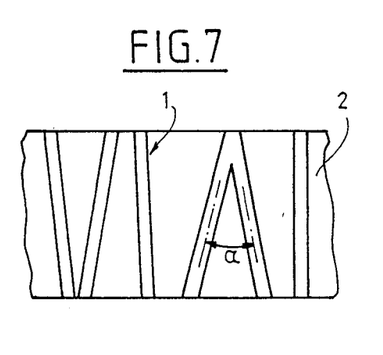
FIGS. 7 and 8 are two diagrammatic views in perspective illustrating the material obtained by working the method, in accordance with the two respective variants of the means for varying the proposed angle of attack.
Figure 8:
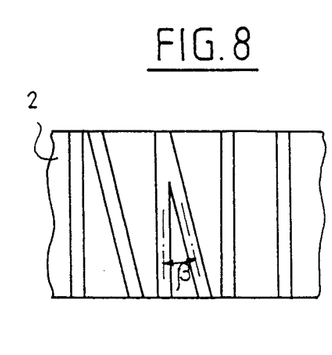
Figure 9A:
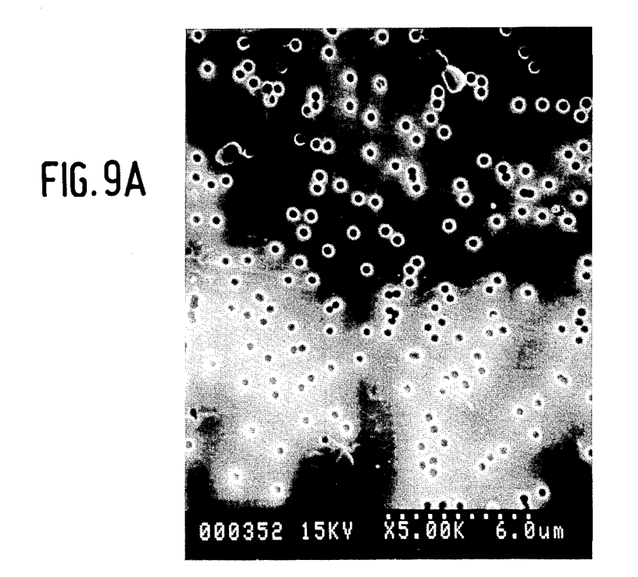
FIGS. 9A, 9B are two larger-scale views of the two surfaces A and B of a film in accordance with a test No. 1, treated by the method according to the invention; these two views are obtained by scanning microscopy.
Figure 9B:
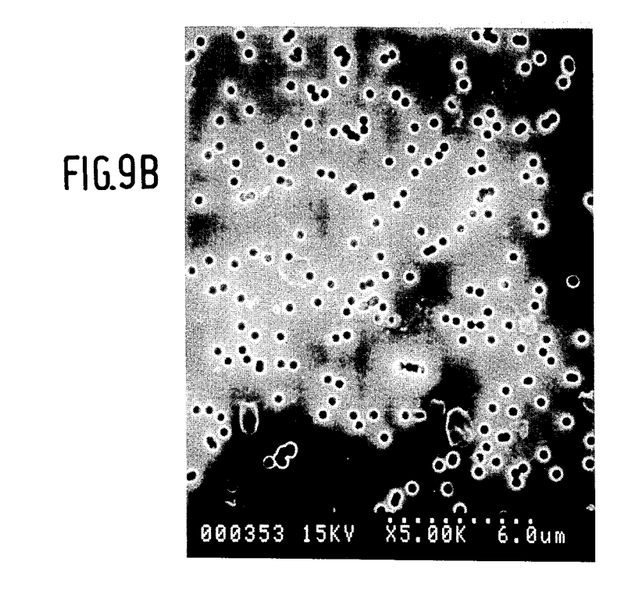
Figure 10A:
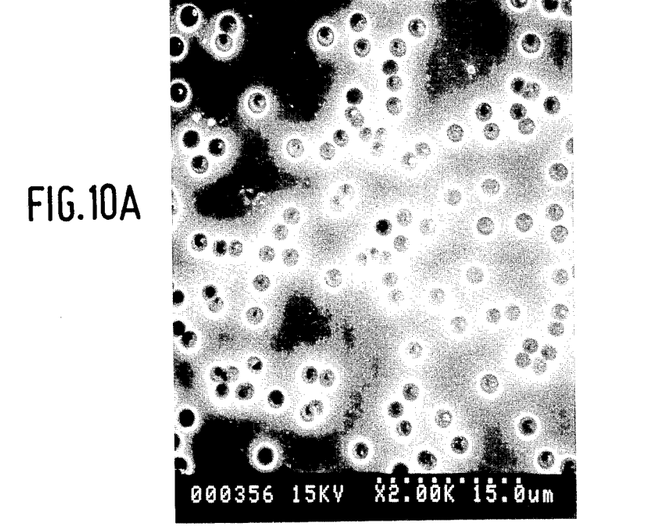
FIGS. 10A and 10B are two similar views of a film in accordance with a test No. 2.
Figure 10B:
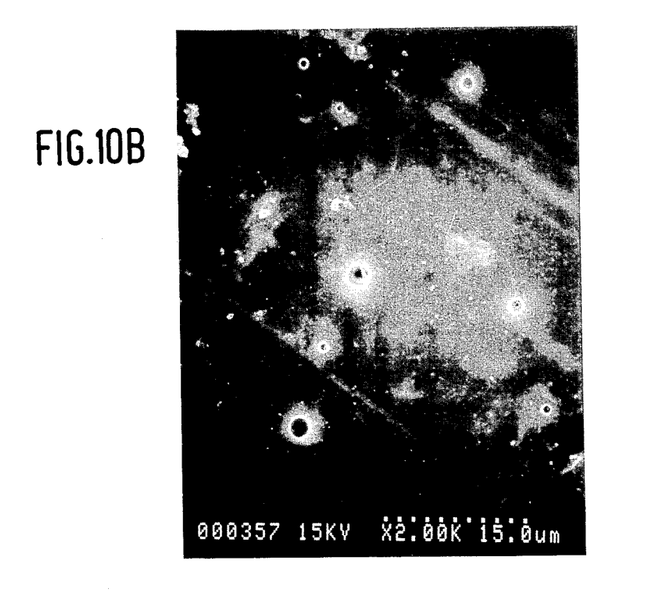

According to another feature of the invention, the angle of attack on a given elementary surface of strip 2 by particles 3 is varied considerably so that even if neighbouring impacts occur, the trajectories of the particles 3 associated with these impacts are sufficiently divergent and non-parallel (FIGS. 7 and 8), thus avoiding the formation of multiple perforations 1, which would affect the selective filtering power of the perforated material 2.

The variation in the angle of attack is brought about in dependence on the thickness E of treated material 2 and the diameter D of the desired perforations 1. The greater the thickness E of material 2, the smaller the variation in the angle of attack can be. The greater the diameter D of perforations 1, the greater has to be the variation in the angle of attack. In accordance with a first approach, the variation in angle (or the tangent of the angle) is substantially proportional to D and inversely proportional to E. Thus, in the case of material 2 about 10 microns thick and perforations about 17,000 Å in diameter, the variation in the angle of attack is about 10°. In general, and as required, except in the case of a very thin material 2 with very small-diameter perforations 1, the variation in the angle of attack is of a very different order of size (e.g. ten times as large) from the variation in the angle of attack resulting from scanning, which is therefore insufficient by itself to prevent multiple perforations 1.

In a first possible variant, the strip 2 is disposed so as to be curved in the bombardment area 11, i.e. sufficiently curved, and not flat. This variant enables a very intense beam 3 to be used, with very low probability of producing double or triple perforations. For example the bombardment area 11 is curved into a cylinder with a transverse axis, having its covexity facing the beam of particles 3.

In a second possible variant the strip of material 2 is flat or substantially flat in the bombardment area 11 and a given elementary surface of material 2 is bombarded in a number of successive passes, each of low intensity, and at sufficiently different angles of attack. For example the strip of material is inclined at different successive angles to the beam of particles 3, in the case of the same surface area of material 2. If required, these successive passes can correspond to the successive passes or groups of passes resulting from the previously-mentioned scanning.

In a preferred variant of the invention, the strip of material 2 is subjected to UV treatment after being bombarded as described hereinbefore and before chemical treatment as described hereinafter. The UV treatment is preferably combined with cooling of the bombarded material 2. Cooling is brought about e.g. by energetic ventilation of strip 2. It has unexpectedly been found, firstly, that exposure of the strip of bombarded material 2 to UV has the affect of regularising the shape of perforations 1, so that they have a cylindrical axial section instead of an "hour glass" shape, and the time needed to obtain perforations 1 is also reduced and, secondly, cooling of the strip 2 during exposure to UV has the effect of reducing the time needed to obtain perforations 1 during the chemical treatment. For example, use has been made of PETP strips 25 microns thick, bombarded with a beam of argon ions (9+) with an energy of 120 Mev and an intensity of 190 nanoamperes, and subsequently treated with a chemical corrosion bath containing 15 grams of sodium hydroxide, 30 grams methanol and 17 ml water at 40° C. The comparative times necessary for obtaining perforations are given in the following Table, which shows the advantageous effect of UV treatment and associated cooling.

| | Bombardment followed by chemical attack | Supplementary intermediate UV treatment | |
| --- | --- | --- | --- |
| | | alone (for an hour) | with energetic cooling |
| Time needed to produce perforations | 20 mins | 30 mins | 10 mins |

For the purpose of continuous treatment of strip 2, the material 2 is chemically treated with a solution of corrosive product in an organic solvent. For example, a caustic soda solution used as the corrosive product dissolved in methanol results in a speed of attack about ten times as great as with an aqueous solution of caustic soda as used hitherto, in the case where material 2 is polycarbonate or the like. The duration of corrosion treatment can then be e.g. between 30 seconds and 2 minutes depending on the desired diameter of perforations 1. Chemical treatment can either be static, when the entire length of strip 2 is immersed at rest for the necessary time in a treatment bath, or dynamic, when the strip of material 2 moves in the bath. This feature of the invention inter alia avoids the need for excessive storage of material 2 or for an expensive chemical processing installation.

Various organic solvents can be used, inter alia ethanol, isopropanol and preferably methanol. The corrosive product may in known manner be sodium or potassium hydroxide. The concentration of the corrosive product in the organic solvent may be between 1% and 50% by weight approx and preferably 5% or similar. The temperature of the corrosive bath can vary between 20° C. and 60° C. approx, preferably between 50° C. and 60° C. approx.

As a result of using an aforementioned organic solvent on a strip of polycarbonate, the duration of chemical treatment can be less than a few minutes under the previously-mentioned temperature conditions, and the quality of perforations is excellent. This length of time is compatible with dynamic treatment by advance of the strip 2 in the bath of corrosive product.

The corrosive treatment can be followed in known manner by neutralisation treatment (e.g. in a bath of acetic acid if a strong base is used in the initial treatment) followed by rinsing and final drying.

The invention also relates to an irradiation device 4 for combining with an isochronous cyclotron (not shown) disposed upstream, for working the previously-described method.

The main characteristics of an aforementioned isochronous cyclotron are known by the skilled addressee and therefore will not be repeated here in detail, since furthermore they do not form part of the invention. The description will be limited to improvements specific to the associated irradiation device 4 for optimum performance of the method.

Figures 1, 2:
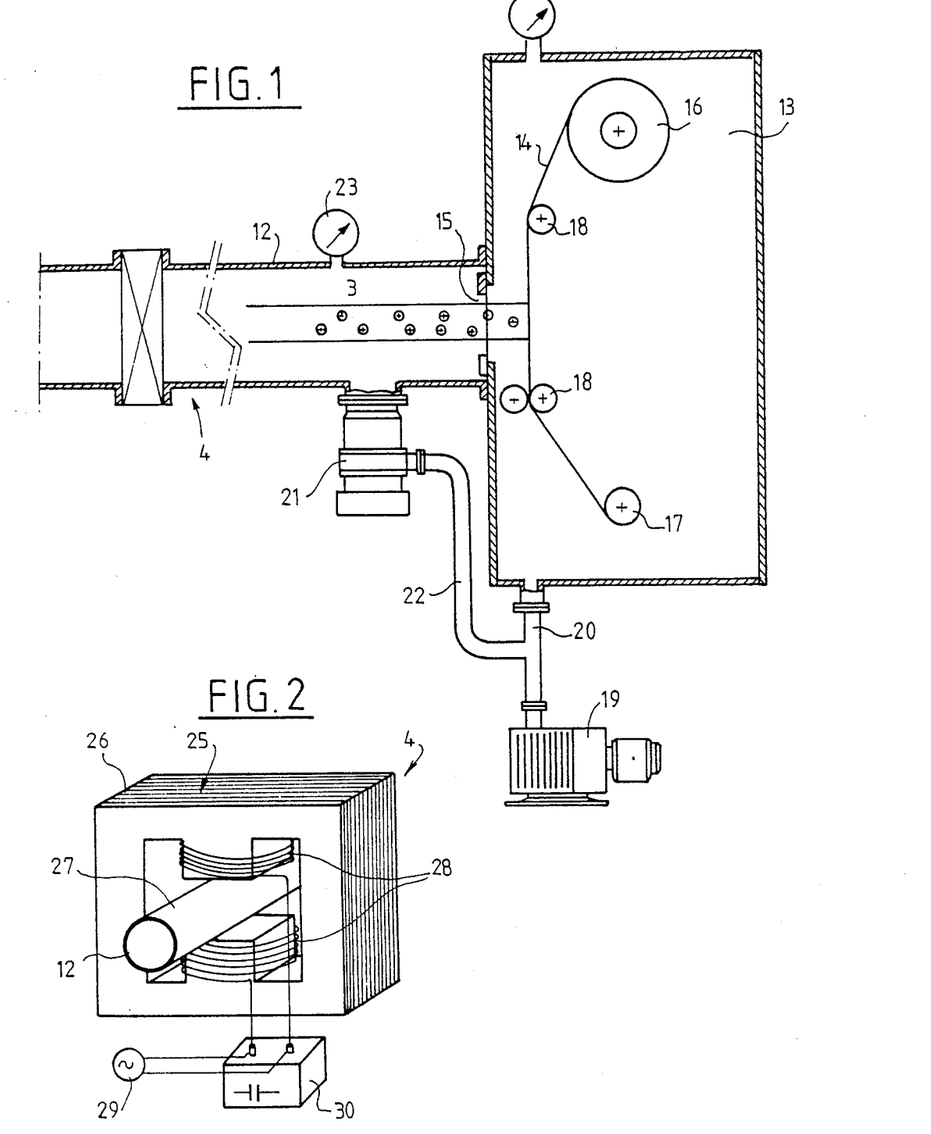
FIG. 1 is a diagrammatic view in section through an axial plane illustrating the high-vacuum chamber of the irradiation device and the sealing-tight tank for the associated handler.
FIG. 2 is a diagrammatic perspective view illustrating the means for deflecting the beam of particles in the irradiation device.

FIG. 1 shows the extreme end part of the high-vacuum chamber 12 of the irradiation device 4, where the beam of particles 3 travels and is channelled. The chamber is placed at the outlet of the isochronous cyclotron and has a substantially cylindrical shape in known manner.

According to the invention, the downstream end of chamber 12 is rigidly connected to an airtight tank 13 containing a handler 14 for the strip 2. Chamber 12 is separated from tank 13, at the place where the respective openings in their walls are opposite one another, by a diaphragm 15 which is adapted not to substantially slow down the particles 3 and also not to substantially modify their trajectories.

Tank 13 is disposed against the downstream end of chamber 2 and in line therewith. Tank 13 has an access door (not shown) with an airtight seal and a window for visually checking whether handler 14 is operating efficiently.

Handler 14 comprises a spool 16 of non-bombarded strip 2, a mandrel 17 for winding the strip 2 after it has been bombarded and therefore has traces of damage, guide rollers 18 and drive means (not shown) for advancing the strip of material 2, inter alia at constant speed.

A primary vacuum pump 19 is associated with tank 13 via a duct 20 and with a secondary-vacuum pump 21 via a branch pipe 22 connected to duct 20. The secondary-vacuum pump 21 is in turn associated with the high-vacuum chamber 12. The arrangement is such that the vacuum in tank 13 is less intense than in chamber 12, without the differential pressure on diaphragm 15 being excessive and particularly without substantially affecting the behaviour of particles 3. For example, the vacuum in chamber 12 is below $10^{-6}$ mm of mercury whereas the vacuum in tank 13 is about $10^{-2}$ mm of mercury. Diaphragm 15 is disposed in the immediate neighbourhood of strip 2—e.g. a few centimeters away—so that the power and direction of beam 3 is not substantially affected either by diaphragm 15 or by the less intense vacuum in tank 13, more specifically over the short distance between diaphragm 15 and the bombardment area 11 opposite the strip of material 2. Since the vacuum in tank 13 is less intense, the time for evacuating tank 13 is considerably reduced, thus making it easier to work the process industrially, inter alia when strip 2 is positioned in or removed from tank 13, which requires opening the access door and consequently breaking the vacuum in tank 13.

Diaphragm 15 is preferably in the form of a metal or other film, i.e. of mechanically strong material which is not likely to be seriously damaged by bombardment with particles 3. The material may inter alia be very pure aluminium from 8 to 12 microns thick approx (e.g. 10 microns or thereabouts). Allowing for this thickness and the nature of the material constituting diaphragm 15, the pressure difference between the two surfaces of diaphragm 15 should remain below about 10 millibars, to prevent mechanical damage to diaphragm 15. Measuring devices 23, 24 for monitoring and adjusting the vacuum can be provided on chamber 12 and tank 13 respectively.

The irradiation device 4 according to the invention (FIG. 2) comprises means 25 for progressively, inter alia permanently, deflecting the beam of particles 3 in its entirety, so that strip 2 is transversely scanned by beam 3. Means 25 comprise e.g. a magnetic deflector interposed on chamber 12, at a sufficient distance from diaphragm 15. The magnetic components 26 of deflector 25 are of laminated steel and form an air gap 27 containing the high-vacuum chamber 12. The windings 28 associated with the magnetic components 26 are connected to an ac source 29 via a power capacitor bank 30 for compensating the considerable reactive power required by the electromagnet 26, 28. The high-vacuum chamber 5, at least opposite the magnetic deflector 25, is made of electrically insulating material to avoid any interference, inter alia mineral glass or organic glass or any similar material.

Means 25 can permanently deflect beam 3 in its entirety, resulting in transverse sinusoidal scanning of strip 2. The amplitude of scanning can be between 40 cm and 60 cm approx.; the frequency of scanning can be 50 Hz or thereabouts, and strip 2 can have a width of about 20 cm and advance at a speed of about 1 meter per second.

Means 25 are designed so that a single elementary surface area of strip 2 for bombardment is treated in a number of successive passes by successive scannings. The scanning angle can be of the order of a few degrees, e.g. between about 3° and 10°. To ensure a sufficient amplitude of scanning while avoiding an excessive angle, means 25 are placed at a sufficient distance from strip 2. For example, chamber 12 has a generally cylindrical shape about 20 cm in diameter and means 25 are at a distance of a number of meters —inter alia about 2 to 6 meters—from diaphragm 15 and consequently from material 2.

The irradiation device 4 according to the invention also comprises means 31 for considerably varying the angle of attack on a single elementary surface area of material 2 by particles 3, inter alia by about 10°. As previously stated, means 31 are used so as to avoid or reduce the risk of producing multiple, inter alia double or triple, perforations.

Figure 4:
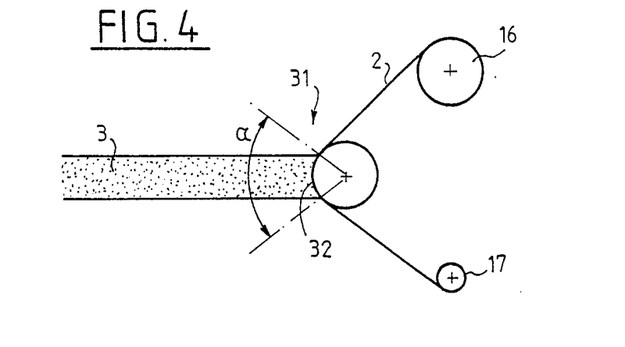
FIG. 4 is a diagrammatic side view illustrating a first possible variant of the means for varying the angle of attack by the particles on the strip of material under treatment.

Means 31 can have a number of variant embodiments. In a first embodiment (FIG. 4), the strip of material 2 is curved in the bombardment area 11, e.g. by means of a curved bearing surface 32 consisting inter alia of a roller having a transverse axis, material 2 being pressed over an arc of the roller. The radius of curvature of surface 32 is sufficiently small for the variation in the angle of attack on material 2 by particles 3, from one extreme transverse edge to the other edge of the bombardment area 11, to be significant and e.g. of the order of a few tens of degrees. The bombardment area 11 forms a cylindrical arc having an angle of aperture $\alpha$. If required, the value of $\alpha$ is such that perforations 1 remain near to a direction perpendicular to the strip of material 2. This first embodiment enables an intense particle beam 3 to be used. For example, the roller constituting the curved bearing surface 39 can have a diameter of the order of 6 to 10 cm, e.g. 8 cm or thereabouts, and angle $\alpha$ can be inter alia between 50° and 90° approx. More specifically, in the case of a strip 2 of material 25 microns thick, made of polycarbonate, and where the perforations 1 are to have a diameter of 1 micron, the diameter of the roller is between 6 cm and 7.5 cm when the strip 2 advances at a speed of 64 cm/s. It has been found that these values result in a minimum number of double and triple perforations and the length of the damaged traces varies by 10% between the longest and the shortest.

Figure 5:
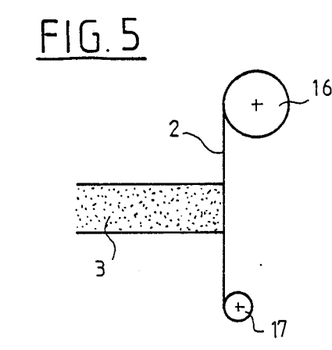
FIGS. 5 and 6 are two diagrammatic perspective views illustrating a second possible variant of the means for varying the angle of attack by the particles on the treated material, in two successive states.
Figure 6:
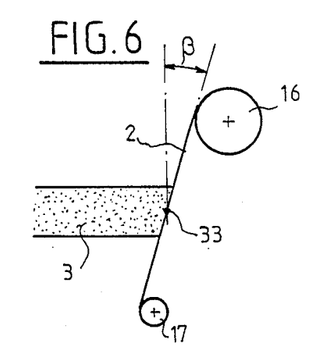

In a second variant (FIGS. 5 and 6), strip 2 is flat, or substantially flat, in the bombardment area 11 and the relative angle of attack on strip 2 by beam 3 progressively varies, a single elementary surface area of material 2 being bombarded in at least two passes at two sufficiently different angles in succession. The two passes affect all or part of a single elementary surface of material 2, as a result inter alia of overlapping scanning. To this end, for example, handler 14 is pivotably mounted in its entirety around an inter alia transverse axis 33 relative to strip 2, between two end positions inclined to one another by an angle $\beta$, drive means (not shown) such as a motor being used to move the handler 14 from one end position to the other. For example, a first end position (FIG. 5) corresponds to perpendicular attack on material 2 by particles 3, whereas a second end position (FIG. 6) corresponds to attack at an angle of about 60°.

The irradiation device 4 is associated with chemical treatment means disposed downstream. In a preferred variant, means for exposing the strip 2 to UV are disposed between the irradiation device 4 and the chemical treatment means, the UV being preferably combined, if necessary, with cooling means such as ventilation means.

The invention also relates to the material 2 formed with perforations 1 by the previously-mentioned method.

Material 2 is preferably a synthetic material, inter alia a polymer, chosen from among polyesters, inter alia polyethylene terephthalate, polycarbonates, inter alia bisphenol-A polycarbonate, aromatic polyethers (sulphone polyethers and ketone polyethers) polysulphones and polyolefins (polyethylene, polypropylene, polyvinyl chloride, vinylidene polyfluoride) and cellulose nitrates and acetates.

Tests have been carried out and show that the quality of the resulting perforations 1 may depend on the material 2 without thereby casting doubt on the principle or conditions for the method according to the invention. For example, two tests were made on polycarbonate films having two different origins, i.e. make LEXAN (General Electric)—test no. 1—and make MAKROFOL N (Bayer)—test no. 2. The two films were treated (bombardment followed by chemical attack) in similar manner. After treatment, the two surfaces (A and B) of each of the two films were examined by scanning microscopy. The two surfaces A and B of the film in test no. 1 were similar with regard to the number and size of perforations 1. On the other hand the two surfaces A and B of the film in test no. 2 were different, one surface (A) having many more and larger perforations 1 than the other surface (B) which had fewer and smaller-diameter perforations 1.

Material 2 can be supplied in a flexible strip having a thickness which can vary between a few microns and more than 100 microns. The width of the strip can vary between 5 cm and about 150 cm. The resulting perforations 1 can have a density per cm$^2$ of up to $10^{11}$, the dimensions of perforations 1 being between 100 Å and 100,000 Å.

The perforations 1 generally extend right through the material 2 and are of the open type, thus basically corresponding to use of the resulting perforated material 2 as a screen or for filtration. The perforations 1 are distributed in random manner in accordance with the successive configurations of the particle beam 3. As a result of the previously-described scanning with overlapping, the distribution of perforations 1 has good uniformity over the entire surface of strip 2.

The angle of attack on material 2 by particles 3 can be varied so as to avoid double or triple perforations 1. When two impacts are adjacent, which can happen though very improbable, it is almost impossible for the two respective traces to be parallel. They will most certainly be divergent, and thus do not affect the selectivity of the material 2 with perforations 1, with regard to its filtering power.

In one possible variant, strip 2 has two longitudinal borders 34 free from perforations 1. Borders 34 can be designed to give some mechanical strength to strip 2. For example they can each have a width of about 20 mm in the case of a strip 2 20 cm wide. If required, strip 2 comprises one or more other strips or surfaces without perforations 1 and extending along the strip or at an angle thereto or differently situated. To this end, masks are placed in the path of beam 3 corresponding to the desired borders or strips or surfaces. These masks are disposed e.g. in and carried by tank 13 or situated between tank 13 and the high-vacuum chamber 12. The material constituting the masks is of suitable nature and thickness for stopping the particles 3. For example, a mask is made of steel a few millimeters thick. Alternatively the masks are the wall of tank 13, which is formed with an aperture which is closed by diaphragm 15.

We claim:

1. A material comprising perforations produced by a method in which the material is first damaged through particle beam bombardment and after which damaged areas of the material are selectively attacked, the material comprising:

a strip of thickness between a few microns and more than 100 microns; a width of between 5 cm and 150 cm; a perforation density of up to $10^{11}$ per cm$^2$; a perforation diameter of between 100 and 100,000 Angstroms.

2. The material of claim 1, wherein:

the material comprises a polymer chosen from among polyesters such as polyethylene terephthalate, polycarbonates such as bisphenol-A polycarbonates, aromatic polyethers, polysulphones and polyolefins, and cellulose nitrates and acetates.

3. The material of claim 1, wherein:

the material comprises one or more borders or strips or surfaces without perforations.

4. An irradiation device for use with an upstream isochronous cyclotron, the device for producing perforations in a material using a method in which the material is first damaged through particle bombardment and after which damaged areas of the material are selectively attacked, the device comprising:

a high-vacuum chamber through which the particles pass;

a tank;

a diaphragm separating the chamber from the tank, the diaphragm disposed substantially near the material and adapted not to substantially slow the particles; and a handler, contained within the tank, for handling the material for treatment.

5. The device of claim 4, further comprising:
a primary vacuum pump connected to the tank; and
a secondary vacuum pump connected to the chamber;
wherein the vacuum in the tank is less intense than the vacuum in the chamber; and
wherein the differential pressure on the diaphragm is not excessive.

6. The device of claim 4, wherein:
the diaphragm comprises a metal or other film made with sufficient mechanical strength, and not capable of being severely damaged by particle bombardment, the diaphragm comprising a material such as aluminum with a thickness of approximately 8-12 microns.

7. The device of claim 4, wherein:
the vacuum in the tank is on the order of 0.01 mm of mercury; and
the vacuum in the chamber is on the order of 0.000001 mm of mercury.

8. An irradiation device for use with an upstream isochronous cyclotron, the device for producing perforations in a material using a method in which the material is first damaged through particle beam bombardment and after which damaged areas of the material are selectively attacked, the device comprising:
means for handling the material in the form of a strip; and
means for deflecting the particle beam to cause transverse scanning of the strip of material by the particle beam.

9. The device of claim 8, wherein:
the means for deflecting comprises a magnetic deflector.

10. The device of claim 9, wherein the magnetic deflector comprises:
an AC source; and
an electromagnet energized by the AC source, components of the electromagnet comprising laminated steel, the chamber being in an air gap, comprising electrically insulating material.

11. An irradiation device for use with an upstream isochronous cyclotron, the device for producing perforations in a material using a method in which the material is first damaged through particle beam bombardment and after which damaged areas of the material are selectively attached, the device comprising:
means for handling the material; and
means for substantially varying an angle of incidence of particles on a given portion of the surface of the material.

12. The device of claim 11, wherein:
the means for substantially varying comprises a curved bearing surface to bear the material in a bombardment area.

13. The device of claim 11, further comprising:
drive means for moving a bombardment area which is movably mounted between two end positions, so as to vary an angle of incidence.

14. An irradiation device for use with an upstream isochronous cyclotron, the device for producing perforations in a material using a method in which the material is first damaged through particle beam bombardment and after which damaged areas of the material are selectively attacked, the device comprising:
means for handling the material in the form of a strip; and
at least one mask comprising a material for stopping the particles, so that the strip of material is given borders or strips or surfaces which do not have perforations.

15. A method of forming perforations in a solid sheet material, comprising:
bombarding the material with heavy strongly-ionized, accelerated ions having an energy of the order of 2 MEV per nucleon, the beam of accelerated particles having an intensity of between, for example, $10^6$ and $10^{16}$ ions per second, using an irradiation device in combination with an upstream isochronous cyclotron, to obtain traces of damage to the material; and
selectively attacking the thus-bombarded material along the damaged traces in order to obtain the perforations.

16. The method of claim 15, further comprising a step, after the bombarding step and before chemical treatment, of:
exposing the material to UV radiation to regularize a cylindrical shape of the perforations and to reduce the time necessary for forming the perforations.

17. The method of claim 16, wherein the exposing step is simultaneously performed with the step comprising:
cooling the material to reduce the time necessary for forming the perforations.

18. The method of claim 17, wherein the cooling step comprises:
cooling the material by ventilation.

19. The method of claim 15, wherein the method comprises:
performing the operation continuously; and
moving the sheet of material formed as a strip in the irradiation device, and, as required, in at least one chemical treatment bath.

20. The method of claim 19, comprising the step of:
driving the strip of material in the irradiation device at a linear speed, which may be a constant speed, of between 0.01 and 5 meters per second, which may be approximately 1 meter per second.

21. The method of claim 15, wherein the bombarding step comprises:
bombarding the material with ions of rare gases such as argon, krypton, neon or xenon.

22. The method of claim 15, comprising the step of:
progressively deflecting the beam of accelerated particles so as to transversely scan the strip of material, so as to regularize the density of the perforations in the material.

23. The method of claim 22, wherein the step of progressively deflecting comprises:
deflecting the beam of particles with an amplitude appreciably greater than the thickness of the strip of material.

24. The method of claim 22, comprising the step of:
deflecting the beam of particles at a frequency such that the advancement of the strip of material during a beam scanning period is less than the dimension of the particle beam in the direction of advancement of the strip of material, so that a single part of the surface of the material is bombarded in a number of successive passes of the particle beam.

25. The method of claim 15, comprising the step:

substantially varying an angle of incidence on a given elementary surface of material by particles, such as by about ten or more degrees, to tend to avoid formation of multiple, double or triple perforations.

26. The method of claim 25, comprising the step:
positioning the material so as to make it curved in a bombarded region so as to vary the angle of incidence on the material.

27. The method of claim 25, comprising the step:
bombarding a single elementary surface of the material in a number of successive passes at at least two different angles of incidence.

28. The method of claim 15, comprising the step:
chemically treating the material with a solution of an attacking or corrosive product in an organic solvent.

29. The method of claim 28, wherein the chemically treating step comprises:
chemically treating the material using an organic solvent which is an alcohol such as ethanol, isopropanol or methanol.

30. The method of claim 28, wherein the chemically treating step comprises:
chemically treating the material with a corrosive product which is a strong base such as sodium hydroxide or potassium hydroxide.

* * * * *

REEXAMINATION CERTIFICATE (2120th)
United States Patent [19]
Legras et al.

[11] B1 4,956,219

[45] Certificate Issued    Nov. 2, 1993

[54] METHOD OF PRODUCING PERFORATIONS IN A SOLID MATERIAL IN SHEET FORM, AN IRRADIATION DEVICE FOR WORKING THE METHOD, AND THE RESULTING PERFORATED MATERIAL

[75] Inventors: Roger Legras, Hannut; Yves Jongen, Ohain, both of Belgium

[73] Assignee: Universite Catholique de Louvain, Belgium

Reexamination Request:
No. 90/002,610, Jan. 16, 1992

Reexamination Certificate for:
Patent No.: 4,956,219
Issued: Sep. 11, 1990
Appl. No.: 130,223
Filed: Mar. 24, 1987

[51] Int. Cl.$^5$ ................................................. B32B 3/00
[52] U.S. Cl. .................................... 343/771; 343/768; 343/770
[58] Field of Search ............... 428/220, 412, 480, 515, 428/520; 204/157.15; 328/234; 280/492.3; 156/625; 343/771, 768, 770

[56] References Cited

U.S. PATENT DOCUMENTS

| | | |
|---|---|---|
| 3,303,085 | 2/1967 | Price et al. |
| 3,493,751 | 2/1970 | Davies et al. |
| 3,612,871 | 10/1971 | Humphrey, Jr. et al. |
| 3,677,844 | 7/1972 | Fleischer et al. |
| 3,713,921 | 1/1973 | Fleischer et al. |
| 3,852,134 | 12/1974 | Bean |
| 4,063,098 | 12/1977 | Enge |
| 4,115,303 | 9/1978 | Marchand et al. |

OTHER PUBLICATIONS

Guillot et al., Characteristics of Submicron Pores Obtained By Chemical Etching of Nuclear Tracks in Polycarbonate Films, Journal of Applied Physics, vol. 52, No. 12, Dec. 1981, pp. 7155-7164 & 947.

Flerov et al., Technique For Preparing Microfilters With High Specific Capacity, Atomnaya Energiya, vol. 53, No. 3, pp. 652-654, U.S.S.R., 1983 (pp. 181-182) attached.

Fischer et al., Production and Use of Nuclear Tracks: Imprinting Structure on Solids, Reviews of Modern Physics, vol. 55, No. 4, Oct. 1983.

Flerov et al., Practical Applications of Heavy Ion Beams, Sov. Phys.-USP., vol. 17, No. 5, Mar.-Apr. 1975, pp. 783-793.

P. Yu. Apel, Measurements of the Diameter of Selectively Etchable Tracks Produced in Polymer By Heavy Ions, Nuclear Tracks, vol. 6, No. 2/3, pp. 115-118, 1982.

A. Roth, Vacuum Sealing Techniques, Pergamon Press, pp. 704-709 (1966).

N. Turner, Improved Uniformity of Implanted Dose By a Compensated Scan Pattern Generator, Nuclear Instruments and Methods, vol. 189 (1981), pp. 311-318.

Matthes et al., Eine Bestrahlungsanlage fur Polienmaterial, Gemeinsamer Jahresbericht, Jun. 1984, p. 108.

R. Spohr, Heavy Ion Nuclear Tracks-An Emerging Technology, IEEE Transactions of Nuclear Science, vol. 55, No. NS-28, No. 2, Apr. 1981, pp. 1448-1451.

Tretyakova et al., A Study of the Registration Properties of Polyethylene-Terephthalate, Proc. 10th Int. Conf. on SSNTD's, Lyon, Jul. 1979 (ed. Francois et al.), Pergamon Press, pp. 283, 284 & 289.

*Primary Examiner*—P. J. Ryan

[57] ABSTRACT

The invention relates to a method of producing perforations in a solid material in sheet form, an irradiation device for working the method and the resulting perforated material.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 6-10 and 15-30 are cancelled.

Claims 4, 5 and 11-14 are determined to be patentable as amended.

New claims 31-51 are added and determined to be patentable.

4. An irradiation device for use with an upstream isochronous cyclotron, the device for producing *calibrated* perforations in a *strip of* material using a method in which the *strip of* material is first damaged through particle bombardment and after which damaged areas of the *strip of* material are selectively attacked, the device comprising:
[a high-vacuum chamber through which the particles pass;]
a tank *having a first vacuum level;*
*a high-vacuum chamber at a second vacuum level through which the particles pass;*
*means for substantially continuously moving the strip of material along a longitudinal axis throughout its entire length at a constant linear speed before an irradiation window, the moving means being providing within the tank;*
*means for generating a beam of heavy strongly-ionized accelerated in front of the irradiation window, so that particles in the beam have a substantially parallel path, the beam being rectangular in cross-section, a longer side of the rectangular cross-section being parallel to the longitudinal axis, the generating means being provided with the high vacuum chamber;*
*a handler, contained within the tank, for handling the material for treatment, the handler constituting means for transversely scanning the beam a distance equal to or greater than twice the strip's width at a speed substantially faster than the speed of the strip, so as to define a number of successive passes on a single elementary surface of the strip; and*
*a diaphragm separating the chamber from the tank, the diaphragm disposed substantially near the material and adapted not to substantially slow the particles*[; and], *the diaphragm constituting means for closing the irradiation window.*
[a handler, contained within the tank, for handling the material for treatment.]

5. The device of claim 4, further comprising:
a primary vacuum pump connected to the tank; and
a secondary vacuum pump connected to the chamber;

wherein the *first* vacuum *level* in the tank is less intense than the *second* vacuum *level* in the chamber; and
wherein [the] *a* differential pressure on the diaphragm *that is defined by the first and second vacuum levels* is not excessive.

11. An irradiation device for use with an upstream isochronous cyclotron, the device for producing *calibrated* perforations in a *strip of* material using a method in which the *strip of* material is first damaged through particle beam bombardment and after which damaged areas of the *strip of* material are selectively [attached] *attacked*, the device comprising:
means for handling the material *by substantially continuously moving the strip of material along a longitudinal axis throughout its entire length at a constant linear speed before and irradiation window, the handling means being providing within a tank having a first vacuum level;*
means for generating a beam of heavy strongly-ionized accelerated in front of the irradiation window, so that particles in the beam have a substantially parallel path, the beam being rectangular in cross-section, a longer side of the rectangular cross-section being parallel to the longitudinal axis, the generating means being provided with a high vacuum chamber at a second vacuum level;
means for transversely scanning the beam a distance equal to or greater than twice the strip's width at a speed substantially faster than the speed of the strip, so as to define a number of successive passes on a single elementary surface of the strip;
*a diaphragm means, disposed substantially near the strip, for closing the irradiation window;* and
means for substantially varying an angle of incidence of particles on a given portion of the surface of the material.

12. The device of claim 11, wherein:
the means for substantially varying [comprises] *includes* a curved bearing surface to bear the material in a bombardment area.

13. The device of claim 11, further comprising:
drive means for moving a bombardment area which is movably mounted between two end positions, so as to vary [an] *the* angle of incidence.

14. An irradiation device for use with an upstream isochronous cyclotron, the device for producing perforations in a material using a method in which the material is first damaged through particle beam bombardment and after which damaged areas of the material are selectively attacked, the device comprising:
means for handling the material in the form of a strip by substantially continuously moving the strip of material along a longitudinal axis throughout its entire length at a constant linear speed before an irradiation window, the handling means being providing within a tank having a first vacuum level;
means for generating a beam of heavy strongly-ionized accelerated in front of the irradiation window, so that particles in the beam have a substantially parallel path, the beam being rectangular in cross-section, a longer side of the rectangular cross-section being parallel to the longitudinal axis, the generating means being provided with a high vacuum chamber at a second vacuum level;
means for transversely scanning the beam a distance equal to or greater than twice the strip's width at a speed substantially faster than the speed of the strip, so as to define a number of successive passes on a single elementary surface of the strip;

a diaphragm means, disposed substantially near the strip, for closing the irradiation window; and at least one mask comprising a material for stopping the particles, so that the strip of material is given borders or strips or surfaces which do not have perforations.

31. The device of claim 4, wherein:
the constant linear speed is between 0.01 and 5 meters per second.

32. The device of claim 4, wherein: the accelerated ions have an energy of about 2 MeV per nucleon; and the beam has an intensity between $10^6$ and $10^{16}$ ions per second.

33. The device of claim 4, wherein:
the diaphragm comprises aluminum with a thickness of approximately 8-12 microns.

34. The device of claim 4, wherein:
the vacuum in the tank is on the order of 0.01 mm of mercury; and
the vacuum in the chamber is on the order of 0.000001 mm of mercury.

35. The device of claim 4, further comprising:
means for substantially varying an angle of incidence of particles on a given portion of the strip's surface.

36. The device of claim 4, further comprising:
at least one mask comprising a material for stopping the particles, so that the strip of material is given borders or surfaces which do not have perforations.

37. The device of claim 4, further comprising:
means for chemically treating the material with a solution of an attacking or corrosive product in an organic solvent.

38. The device of claim 11, wherein:
the constant linear speed is between 0.01 and 5 meters per second.

39. The device of claim 11, wherein: the accelerated ions have an energy of about 2 MeV per nucleon; and the beam has an intensity between $10^6$ and $10^{16}$ per second.

40. The device of claim 11, wherein:
the diaphragm comprises aluminum with a thickness of approximately 8-12 microns.

41. The device of claim 11, wherein:
the vacuum in the tank is on the order of 0.01 mm of mercury; and
the vacuum in the chamber is on the order of 0.000001 mm of mercury.

42. The device of claim 11, further comprising:
means for substantially varying an angle of incidence of particles on a given portion of the strip's surface.

43. The device of claim 11, further comprising:
at least one mask comprising a material for stopping the particles, so that the strip of material is given borders or surfaces which do not have perforations.

44. The device of claim 11, further comprising:
means for chemically treating the material with a solution of an attacking or corrosive product in an organic solvent.

45. The device of claim 14, wherein:
the constant linear speed is between 0.01 and 5 meters per second.

46. The device of claim 14, wherein: the accelerated ions have an energy of about 2 MeV per nucleon; and the beam has an intensity between $10^6$ and $10^{16}$ ions per second.

47. The device of claim 14, wherein:
the diaphragm comprises aluminum with a thickness of approximately 8-12 microns.

48. The device of claim 14, wherein:
the vacuum in the tank is on the order of 0.01 mm of mercury; and
the vacuum in the chamber is on the order of 0.000001 mm of mercury.

49. The device of claim 14, further comprising:
means for substantially varying an angle of incidence of particles on a given portion of the strip's surface.

50. The device of claim 14, further comprising:
at least one mask comprising a material for stopping the particles, so that the strip of material is given borders or surfaces which do not have perforations.

51. The device of claim 14, further comprising:
means for chemically treating the material with a solution of an attakcing or corrosive product in an organic solvent.

* * * * *